US008164686B2

(12) United States Patent
Togawa

(10) Patent No.: US 8,164,686 B2

(45) Date of Patent: Apr. 24, 2012

(54) SURVEILLANCE TELEVISION CAMERA

(75) Inventor: Eiji Togawa, Nagoya (JP)

(73) Assignee: Elmo Co., Ltd., Aichi (JP)

( * ) Notice: Subject to any disclaimer, the term of this patent is extended or adjusted under 35 U.S.C. 154(b) by 1098 days.

(21) Appl. No.: 12/070,991

(22) Filed: Feb. 22, 2008

(65) Prior Publication Data

US 2008/0211913 A1 Sep. 4, 2008

(30) Foreign Application Priority Data

Mar. 2, 2007 (JP) ................................ 2007-052237

(51) Int. Cl.
*H04N 5/225* (2006.01)

(52) U.S. Cl. ......................... 348/373; 348/143; 348/151

(58) Field of Classification Search .................. 348/144, 348/373

See application file for complete search history.

(56) References Cited

U.S. PATENT DOCUMENTS

| | | | | | |
|---|---|---|---|---|---|
| 4,280,762 | A | * | 7/1981 | Prochnow | 396/349 |
| 4,320,949 | A | * | 3/1982 | Pagano | 396/427 |
| 4,967,331 | A | * | 10/1990 | Rubin | 362/433 |
| 5,844,604 | A | * | 12/1998 | Myeong | 348/373 |
| 5,940,122 | A | * | 8/1999 | Kizawa et al. | 348/151 |
| 6,027,257 | A | * | 2/2000 | Richards et al. | 396/428 |
| 6,234,691 | B1 | * | 5/2001 | Jones et al. | 396/427 |
| 7,170,560 | B2 | * | 1/2007 | Tatewaki et al. | 348/375 |
| 7,609,321 | B2 | * | 10/2009 | Yamane | 348/373 |
| 2004/0218043 | A1 | * | 11/2004 | Robinson | 348/151 |
| 2006/0050150 | A1 | * | 3/2006 | Yamane | 348/151 |
| 2010/0265388 | A1 | * | 10/2010 | Soumi | 348/374 |

FOREIGN PATENT DOCUMENTS

| | | | |
|---|---|---|---|
| JP | 2006-74657 | | 3/2006 |
| JP | 2006-276469 | A | 10/2006 |

* cited by examiner

*Primary Examiner* — Firmin Backer
*Assistant Examiner* — Hamza Algibhah
(74) *Attorney, Agent, or Firm* — DLA Piper LLP (US)

(57) ABSTRACT

A surveillance television camera including a camera base which is mounted on an installation surface and to which a surveillance television camera is mounted, a dome cover which is detachably attachable to the camera base and a locking device including a movable locking member mounted on the camera base and an elastic member biasing the movable locking member toward a joint surface of the movable locking member relative to the dome cover. The camera base has a joint surface relative to the dome cover. The dome cover has a fitting recess formed in the joint surface. When the joint surfaces of the camera base and the dome cover are joined together so that the dome cover is turned circumferentially thereby to be attached to the camera base, the movable locking member is fitted into the fitting recess of the dome cover by a biasing force of the elastic member.

2 Claims, 7 Drawing Sheets

SURVEILLANCE TELEVISION CAMERA

CROSS-REFERENCE TO RELATED APPLICATIONS

This application is based upon and claims the benefit of priority from the prior Japanese Patent Application No. 2007-052237, filed on Mar. 2, 2007, the entire contents of which are incorporated herein by reference.

BACKGROUND OF THE INVENTION

1. Field of the Invention

The present invention relates to a surveillance television camera having a dome cover, and more particularly to such a surveillance camera in which a dome cover is detachably attachable to a base of the camera.

2. Description of the Related Art

Surveillance television cameras are conventionally provided with a transparent or translucent dome cover which covers a television camera body for the purposes of waterproof and dustproof or in order that the directionality of a camera lens may be hidden. JP-A-2006-074657 discloses a surveillance television camera to which a bayonet dome cover is detachably attachable. In the disclosed camera, a locking recess is formed in an engagement piece provided on a joint surface of the dome cover to the camera base. The camera base has a joint surface to the dome cover. The joint surface of the camera base is provided with an engagement groove which has an inner end formed with an engagement protrusion. The engagement recess and protrusion are engaged with each other in a bayonet manner so that the dome cover is detachably attached to the camera base.

However, when the dome cover is attached to the camera base in the bayonet manner, it is difficult to understand whether the engagement recess and protrusion are reliably engaged with each other. Furthermore, when the engagement is insufficient, the dome cover is caused to turn in a direction opposite to an attaching direction, whereupon the dome cover may fall off.

SUMMARY OF THE INVENTION

Therefore, an object of the present invention is to provide a surveillance television camera in which the dome cover can reliably be attached to the camera base by provision of a locking device and the attached state can easily be confirmed.

The present invention provides a surveillance television camera including a camera base which is mounted on an installation surface and to which a surveillance television camera is mounted and a dome cover which is detachably attachable to the camera base, the surveillance television camera comprising a locking device including a movable locking member provided on the camera base and an elastic member biasing the movable locking member toward a direction of a joint surface of the movable locking member to the dome cover, wherein the camera base has a joint surface relative to the dome cover, the dome cover has a fitting recess formed in the joint surface thereof, and when the joint surfaces of the camera base and the dome cover are joined together so that the dome cover is turned circumferentially thereby to be attached to the camera base, the movable locking member is fitted into the fitting recess of the dome cover by a biasing force of the elastic member.

According to the foregoing surveillance television camera, the movable locking member is fitted into the fitting recess formed in the joint surface of the dome cover relative to the camera base by a biasing force of the elastic member, whereupon the dome cover can reliably be attached to the camera base. Furthermore, the dome cover can be prevented from being turned in a direction opposite to an attaching direction by the locking device.

In one embodiment, the locking device includes a slide lever formed on a side of the movable locking member, and the slide lever is manually operable near an outer surface of the camera base. Consequently, whether the locking device is reliably in operation can easily be visually confirmed.

In another embodiment, the dome cover is detachably attachable to the camera base by a bayonet coupling. Consequently, the dome cover can be attached to the camera base by a one-touch operation.

BRIEF DESCRIPTION OF THE DRAWINGS

Other objects, features and advantages of the present invention will become clear upon reviewing the following description of the embodiment with reference to the accompanying drawings, in which.

DETAILED DESCRIPTION OF THE INVENTION

Figure 1:
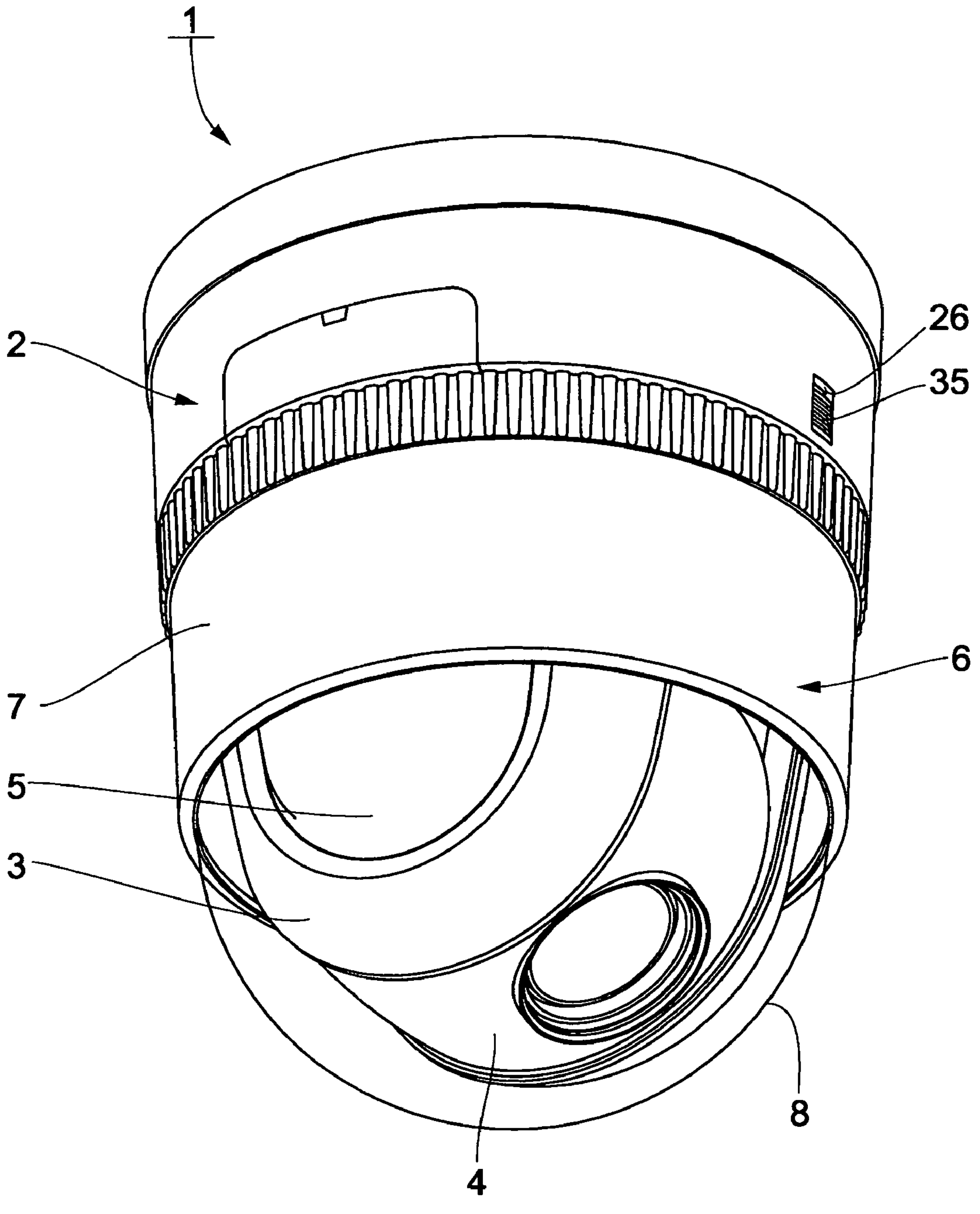
FIG. 1 is a perspective view of a surveillance television camera of an embodiment of the present invention.

One embodiment of the present invention will be described with reference to the accompanying drawings. FIG. 1 illustrates a surveillance television camera 1 of the embodiment of the invention. The surveillance television camera 1 includes a cylindrical camera base 2 which is to be installed on an installation surface such as a ceiling. The camera base 2 encloses a base plate (not shown) having a drive shaft (not shown). A pair of shaft support brackets 3 are provided on the base plate.

A surveillance television camera 4 (hereinafter, "camera") is fixed to a tilt shaft 5 mounted between the shaft support brackets 3. The camera 4 has a zooming function. A turning shaft (not shown) and the tilt shaft 5 are driven by respective stepping motors (neither shown) controlled by a controller so that the camera 4 is turned in the pan/tilt direction. Furthermore, the camera 4 includes a dome cover 6 which is detachably attached to the camera base 2 by a bayonet coupling in order that the camera 4 may be waterproofed and dust proofed or a direction of a camera lens may be hidden from view. The dome cover 6 includes a cylindrical base 7 and a distal end 8 formed into a dome shape and is transparent or has a smoked-color.

Figure 2:
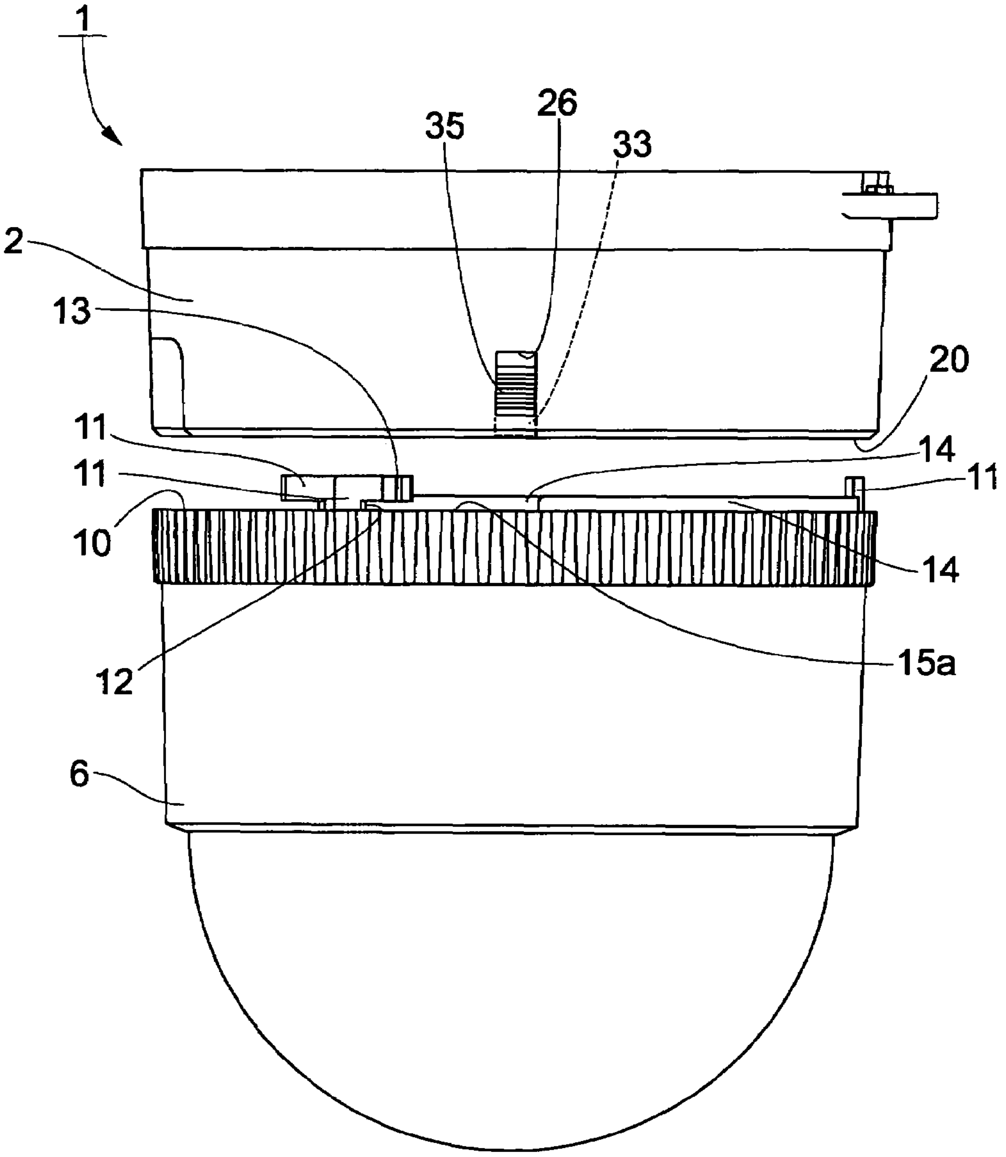
FIG. 2 is a front view of a camera base and a dome cover both of which are separated from each other.
Figure 3:
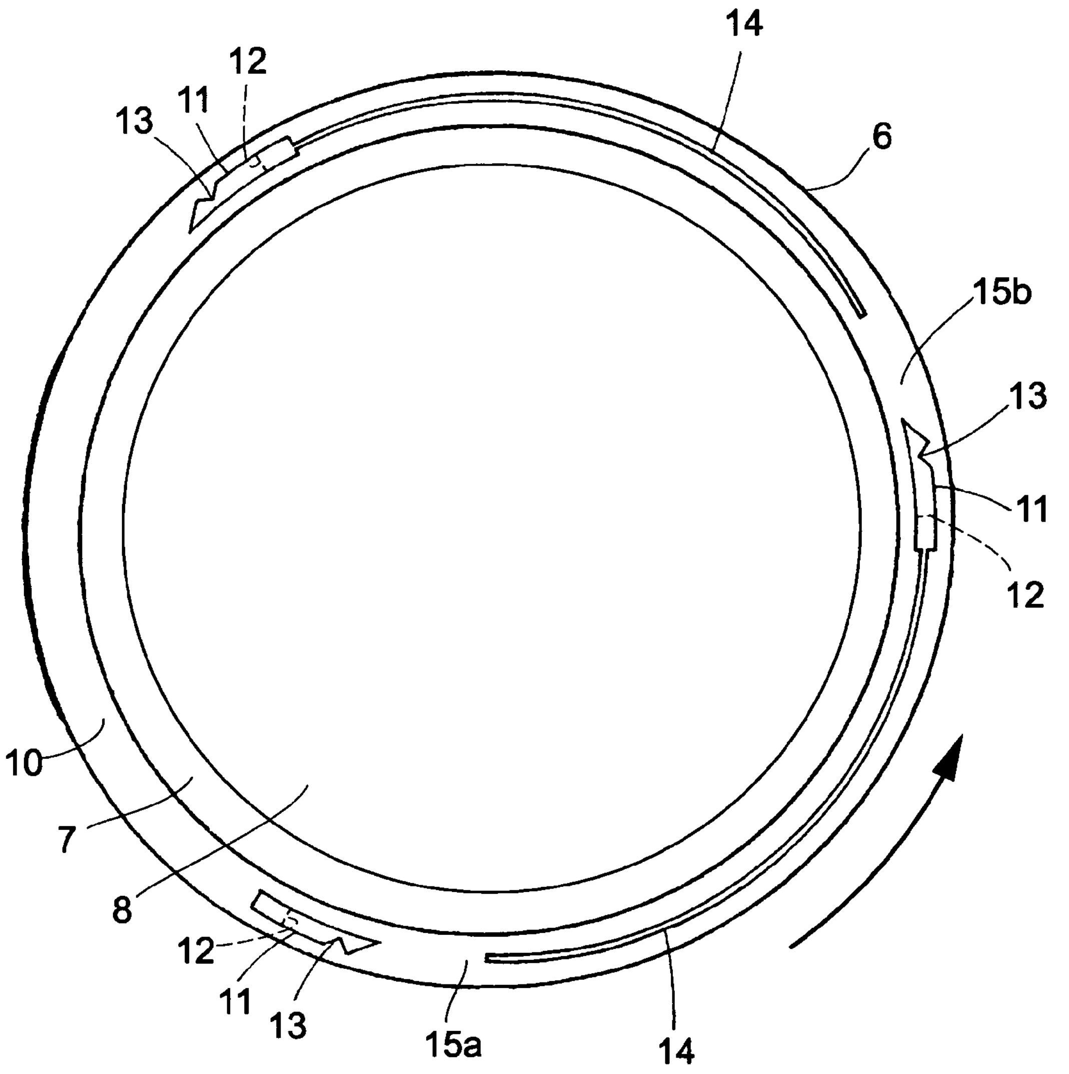
FIG. 3 is a plan view of the dome cover.
Figure 4:
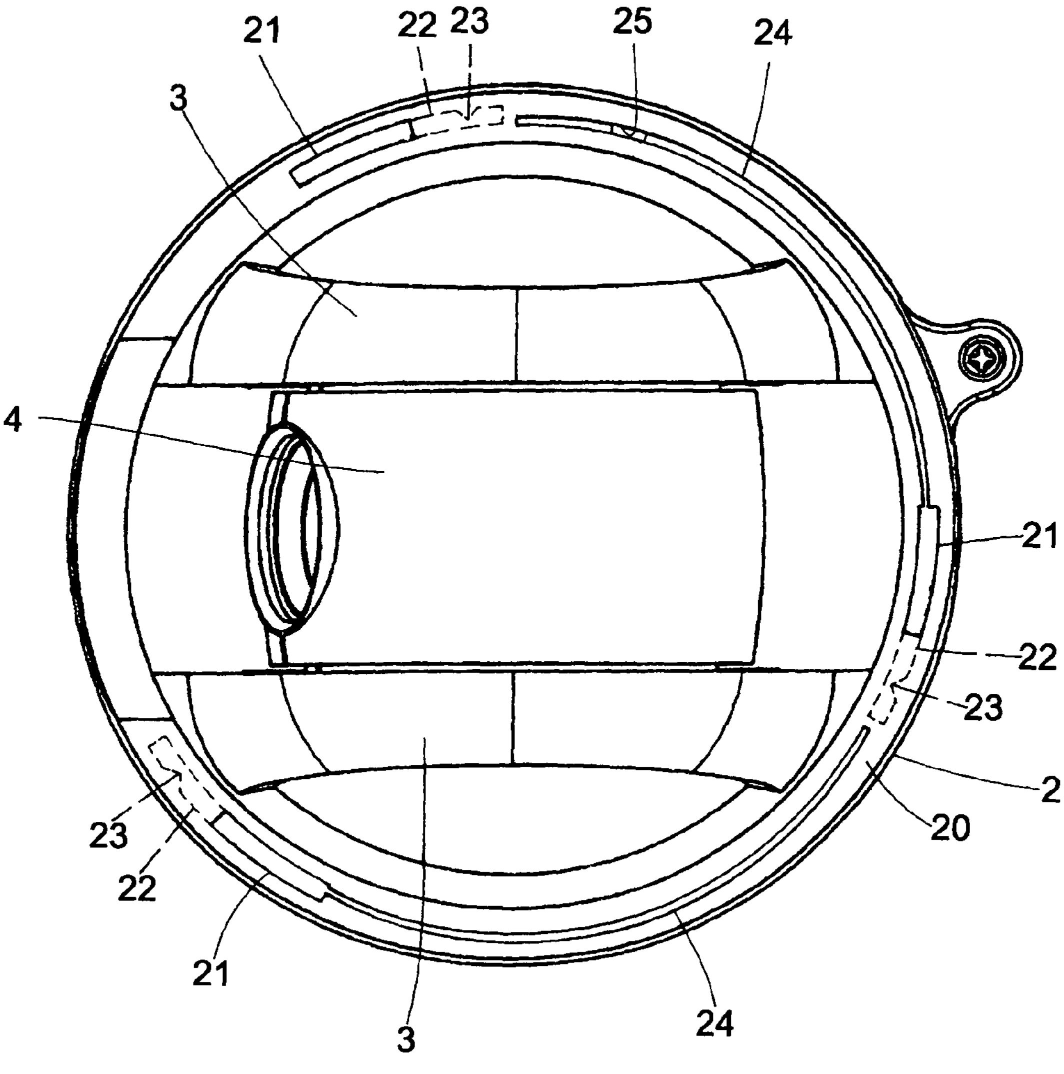
FIG. 4 is a plan view of the camera base.

FIG. 2 is a front view of the camera base 2 and the dome cover 6 both of which are separated from each other. FIG. 3 is a plan view of the dome cover 6 and FIG. 4 is a plan view of the camera base 2. Referring to FIGS. 2 and 3, the base 7 of the dome cover 6 includes a joint surface 10 which is to be joined with a joint surface 20 of the base 2 and has three engagement pieces 11 formed at intervals of 120 degrees so that the engagement pieces protrude. Each engagement piece 11 includes a proximal portion having an entrance groove 12 formed in parallel with the joint surface 10. The engagement grooves 12 have respective cleaving directions along the same circumferential direction. Each engagement piece 11 has a distal end with a side formed with a locking recess 13. Furthermore, two of the engagement pieces 11 have arc-shaped fitting protrusions 14 extending in a direction opposed to the entrance grooves 12 respectively. Recesses 15*a* and 15*b* are formed between the fitting protrusions 14 and the engagement pieces 11 respectively.

Referring to FIGS. 2 and 4, the camera base 2 has a joint surface 20 which is joined with the joint surface 10 of the dome cover 6. The joint surface 20 has three engagement holes 21 formed at the intervals of 120 degrees so that the engagement holes correspond to the respective engagement pieces 11 formed on the dome cover 6. Each engagement hole 21 includes an engagement groove 22 which is continuous thereto at the underside of the joint surface 20 and is formed so as to extend circumferentially. Each engagement groove 22 has a locking protrusion 23 formed on an inner end thereof. When the dome cover 6 is attached to the camera base 2 by a bayonet coupling, the locking protrusions 23 are engaged with the engagement recesses 13 of the engagement pieces 11 of the dome cover 6 respectively.

Furthermore, two arc-shaped fitting grooves 24 are formed so as to be continuous from two of the engagement holes 21 and so as to extend in a direction opposed to the engagement grooves 22 respectively. One of the fitting grooves 24 has an insertion hole 25 into which a locking piece 33 of a movable locking member 31 is to be inserted as will be described later. The fitting grooves 24 correspond to the protrusions 14 of the dome cover 6 and the recesses 15*a* and 15*b* respectively. On the other hand, the camera base 2 has a side in which an operation hole 26 is formed. The operation hole 26 assumes a position where the same corresponds to the insertion hole 25.

Figure 5:
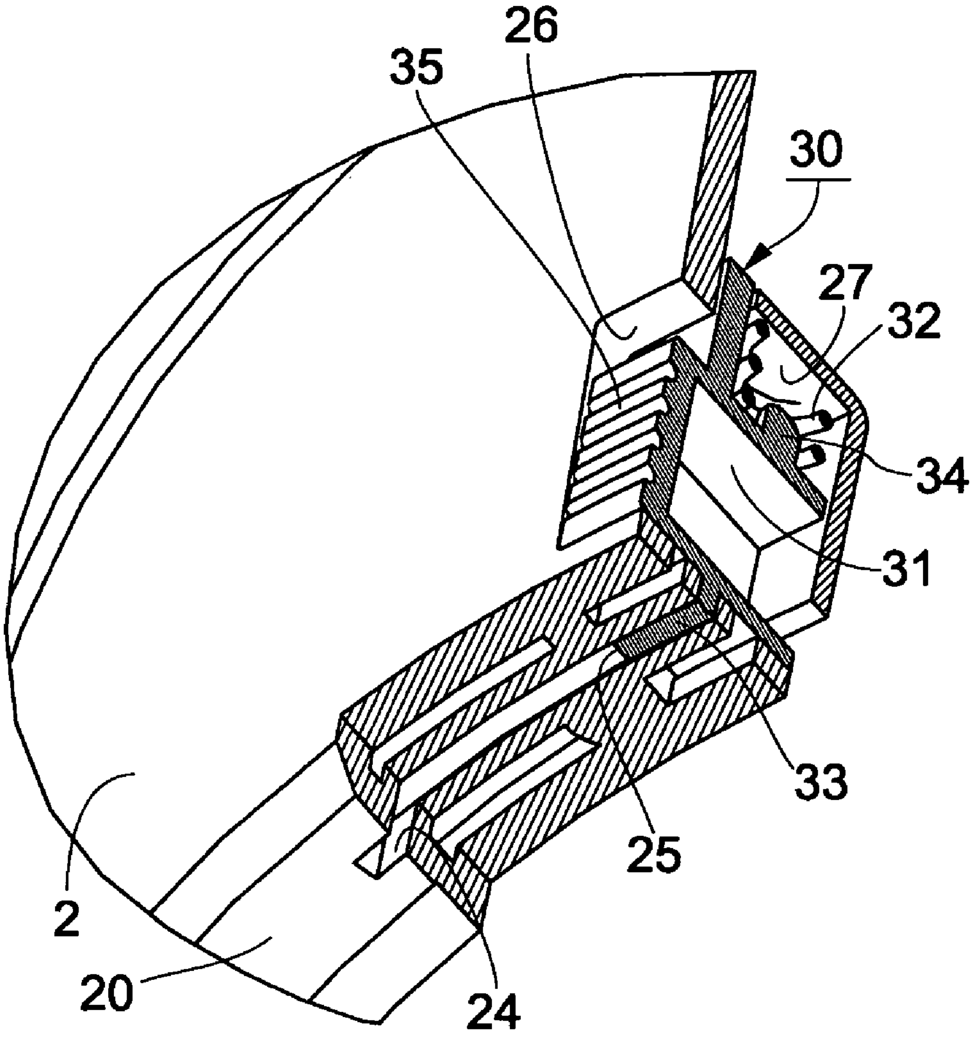
FIG. 5 is a partially enlarged sectional perspective view of a locking device provided on the camera base.

FIG. 5 is a partially enlarged sectional perspective view showing an inner structure of the operation hole 26. A locking device 30 is provided in a locking device holder 27 formed in the insertion hole 25 of the joint surface 20 of the camera base 2. The locking device 30 comprises a movable locking member 31 and an elastic member 32. The movable locking member 31 has a locking piece 33 protruding from a lower part thereof, spring-catch protrusion 34 formed on an upper part thereof and a slide lever 35 formed on a side thereof. The elastic member 32 is a coil spring biasing the movable locking member 31 and is attached in the locking device holder 27. The locking piece 33 of the movable locking member is engaged in the engagement hole 25 formed in the fitting groove 24 of the joint surface 20 of the camera base 2. The slide lever 35 of the movable locking member 31 is fitted in the operation hole 26 and exposed on the side of the camera base 2.

Figure 6:
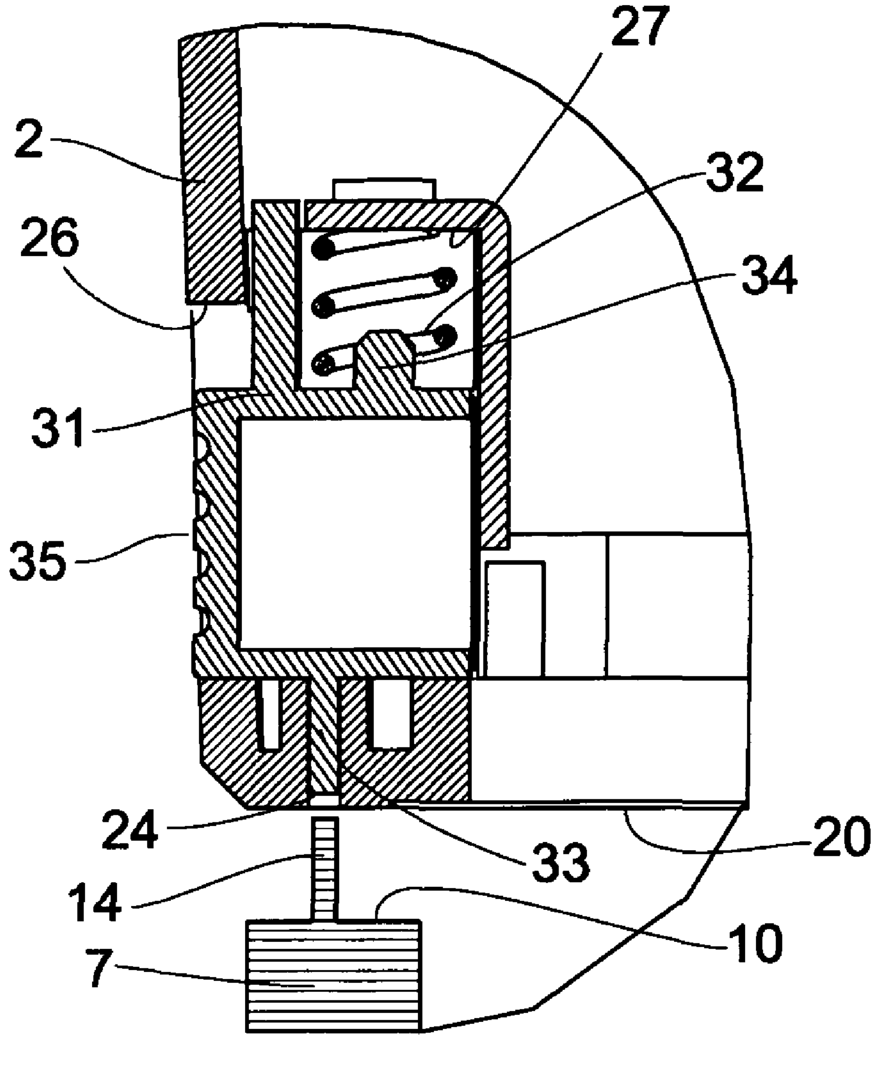
FIG. 6 is a partially enlarged sectional perspective view of the locking device before attachment of the dome cover to the camera base.
Figure 7:
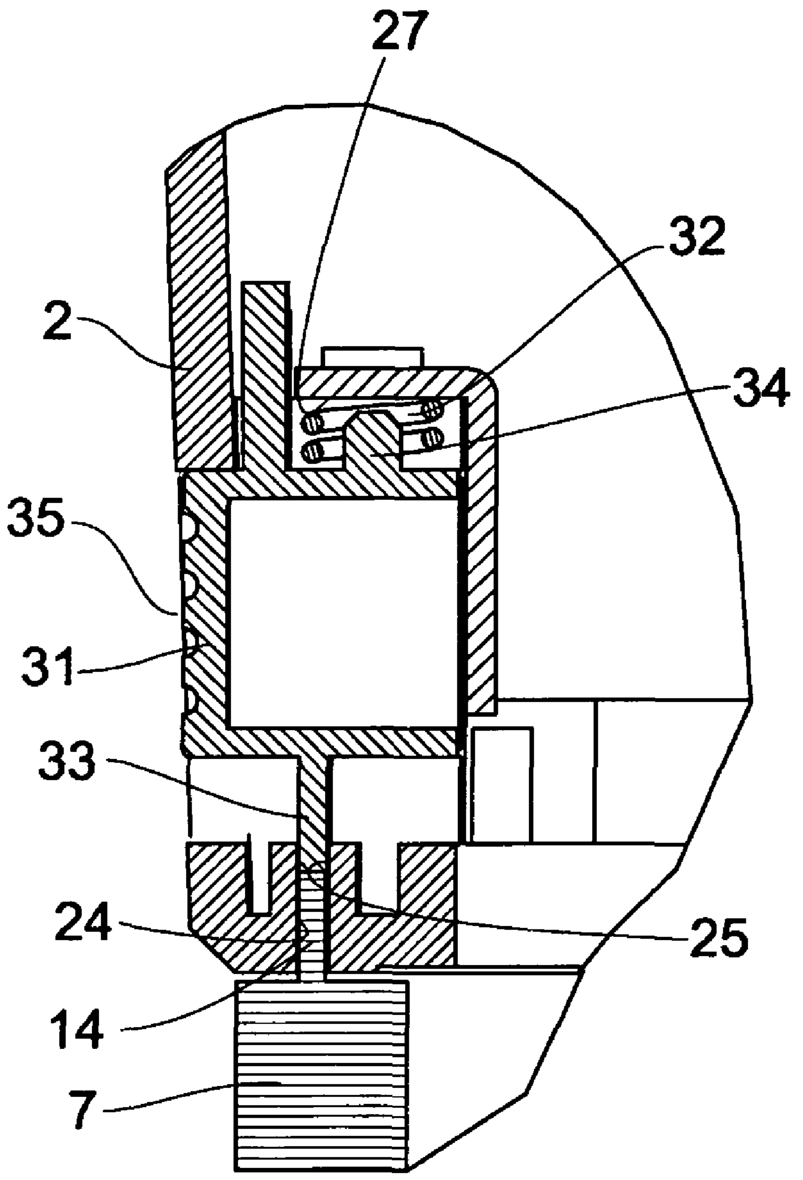
FIG. 7 is a partially enlarged sectional perspective view of the locking device after attachment of the dome cover to the camera base.

The operation of the surveillance television camera 1 will now be described. FIGS. 6 and 7 are partially enlarged sectional perspective views of the locking device 30 before and after attachment of the dome cover 6 to the camera base 2 respectively. When the dome cover 6 is attached to the camera base 2, the joint surface 10 of the dome cover 6 is placed so as to be opposed to the joint surface 20 of the camera base 2. The fitting protrusions 14 provided on the joint surface 10 of the base 7 of the dome cover 6 are fitted in the grooves 24 provided in the joint surface 20 of the camera base 2 respectively, and the engagement pieces 11 are engaged in the engagement holes 21 respectively. In this case, the locking piece 33 engaged in the engagement hole 25 is pushed upward by the fitting protrusions 14 of the dome cover 6 against a biasing force of the coil spring serving as the elastic member 32.

When the dome cover 6 is turned in the direction shown by arrow in FIG. 3 relative to the camera base 2, the distal ends of the engagement pieces 11 engage the respective engagement grooves 22. Furthermore, the fitting protrusions 14 are moved along the respective fitting grooves 24, and the locking piece 33 is slid on the upper surface of the fitting protrusion 14. When the locking protrusions 23 provided on the inner ends of the engagement grooves are locked by the respective locking recesses 13 provided in the engagement pieces 11, the dome cover 6 is attached to the camera base 2 by the bayonet coupling.

When corresponding to the fitting recess 15*a*, the locking piece 33 of the movable locking member 31 slid to the terminal end of the fitting protrusion 14 is biased by the elastic member 32 concurrently with the attachment of the dome cover 6 to the camera base 2. In this case, the locking piece 33 serves as a stopper, whereby the dome cover 6 is prevented from turning in the direction opposed to the attaching direction.

According to the foregoing embodiment, the dome cover 6 can be prevented from turning in the reverse direction by the locking device 30 when attached to the camera base 2 by the bayonet coupling. Furthermore, whether the dome cover 6 has reliably been attached to the camera base 2 can easily be confirmed by viewing the location of the slide lever 35 appearing on the side of the camera base 2. Consequently, the dome cover 6 can be prevented from suddenly falling off and the safety can be improved.

The attachment of the dome cover 6 to the camera base 2 should not limited by the bayonet coupling. A locking hole may be provided in the joint surface 20 of the camera base 2 and a locking claw provided on the joint surface 10 of the dome cover 6 may be locked in the locking hole.

The foregoing description and drawings are merely illustrative of the principles of the present invention and are not construed in a limiting sense. Various changes and modifications will become apparent to those of ordinary skill in the art. All such changes and modifications are seen to fall within the scope of the invention as defined by the appended claims.

What is claimed is:

1. A surveillance television camera including a camera base which is mounted on an installation surface and to which the surveillance television camera is mounted and a dome cover which is detachably attachable to the camera base, the surveillance television camera comprising:

- a locking device including a movable locking member provided on the camera base and an elastic member biasing the movable locking member toward a direction of a joint surface of the movable locking member to the dome cover, wherein:
- the camera base has a joint surface relative to the dome cover;
- the dome cover has a fitting recess formed in the joint surface thereof;
- when the joint surfaces of the camera base and the dome cover are joined together so that the dome cover is turned circumferentially thereby to be attached to the camera base, the movable locking member is fitted into the fitting recess of the dome cover by a biasing force of the elastic member, and
- the locking device includes a slide lever formed on a side of the movable locking member, and the slide lever is manually operable near an outer surface of the camera base.

2. The surveillance television camera according to claim 1, wherein the dome cover is detachably attachable to the camera base by a bayonet coupling.

* * * * *